(12) United States Patent
de Vos

(10) Patent No.: US 11,465,103 B2
(45) Date of Patent: Oct. 11, 2022

(54) AQUEOUS PHASE SEPARATION METHOD

(71) Applicant: Universiteit Twente, Enschede (NL)

(72) Inventor: Wiebe Matthijs de Vos, Enschede (NL)

(73) Assignee: Universiteit Twente, Enschede (NL)

( * ) Notice: Subject to any disclaimer, the term of this patent is extended or adjusted under 35 U.S.C. 154(b) by 293 days.

(21) Appl. No.: 15/972,273

(22) Filed: May 7, 2018

(65) Prior Publication Data
US 2018/0318775 A1 Nov. 8, 2018

Related U.S. Application Data

(60) Provisional application No. 62/502,833, filed on May 8, 2017.

(51) Int. Cl.

| B01D 71/68 | (2006.01) |
|---|---|
| B01D 71/32 | (2006.01) |
| B01D 71/26 | (2006.01) |
| C08J 5/22 | (2006.01) |
| B01D 71/40 | (2006.01) |
| B01D 67/00 | (2006.01) |
| B01D 69/02 | (2006.01) |
| B01D 69/12 | (2006.01) |
| B01D 69/14 | (2006.01) |

(52) U.S. Cl.
CPC .......... *B01D 71/68* (2013.01); *B01D 67/0011* (2013.01); *B01D 67/0016* (2013.01); *B01D 69/02* (2013.01); *B01D 71/26* (2013.01); *B01D 71/32* (2013.01); *B01D 71/40* (2013.01); *C08J 5/2231* (2013.01); *B01D 69/12* (2013.01); *B01D 69/142* (2013.01); *B01D 2313/30* (2013.01); *B01D 2325/14* (2013.01); *B01D 2325/16* (2013.01); *B01D 2325/18* (2013.01); *C08J 2327/12* (2013.01); *C08J 2333/08* (2013.01); *C08J 2381/06* (2013.01)

(58) Field of Classification Search
CPC ....................................................... B01D 71/68
See application file for complete search history.

(56) References Cited

U.S. PATENT DOCUMENTS

| 2,958,682 A | 11/1960 | Schuller et al. |
|---|---|---|
| 3,133,132 A | 5/1964 | Loeb |
| 3,819,589 A | 6/1974 | Fauke et al. |

(Continued)

FOREIGN PATENT DOCUMENTS

WO WO2017043233 A1 3/2017

OTHER PUBLICATIONS

Loeb, S. ACS Symposium Series, vol. 153, DOI: 10.1021/bk-1981-0153.ch001.

(Continued)

*Primary Examiner* — Peter Keyworth
(74) *Attorney, Agent, or Firm* — N.V. Nederlandsch Octrooibureau; Tamara C. Stegmann; Catherine A. Shultz

(57) ABSTRACT

The invention is in the field of methods for preparing polymer films, and of such polymer films. The method involves phase separation and requires only aqueous solution, eliminating the need for organic solvents. The aqueous phase separation involves contacting a polymer solution comprising a trigger-responsive polymer with an aqueous coagulation solution in which the trigger-responsive polymer is not soluble.

13 Claims, 5 Drawing Sheets

A "Traditional"

B "Aqueous Phase Separation"

(56) References Cited

U.S. PATENT DOCUMENTS

| | | | |
|---|---|---|---|
| 2011/0240556 A1* | 10/2011 | Hoek | C08L 79/02 |
| | | | 210/650 |
| 2015/0190760 A1* | 7/2015 | Singh | B01D 69/02 |
| | | | 210/654 |
| 2017/0007963 A1* | 1/2017 | Livingston | B01D 67/0011 |
| 2018/0169587 A1* | 6/2018 | Hermans | B01D 69/12 |

OTHER PUBLICATIONS

Reuvers, A.J., Van Den Berg, J.W.A. and Smolders, C.A., 1987. Formation of membranes by means of immersion precipitation: Part I. A model to describe mass transfer during immersion precipitation. Journal of membrane science, 34(1), pp. 45-65.

De Grooth, J., Oborny, R., Potreck, J., Nijmeijer, K. and De Vos, W.M., 2015. The role of ionic strength and odd-even effects on the properties of polyelectrolyte multilayer nanofiltration membranes. Journal of membrane science, 475, pp. 311-319.

Wandera, D , Wickramasinghe, S.R. and Husson, S M , 2010. Stimuli-responsive membranes Journal of Membrane Science, 357(1-2), pp. 6-35.

Rankin and Lowe; Macromolecules 2008, 41, 614-622; DOI: 10.1021/ma701952c.

Baker, Richard W. Membrane technology and applications. John Wiley & Sons, 2012.

\* cited by examiner

AQUEOUS PHASE SEPARATION METHOD

FIELD OF THE INVENTION

The invention is in the field of methods for preparing polymer films, and of such polymer films. The method involves phase separation and requires only aqueous solution, eliminating the need for organic solvents.

BACKGROUND ART

Polymer films find use in various fields. An important type of film is a membrane, which in the context of this invention is a polymer film that separates two environments. A porous membrane can effect separations by allowing selective passage of substances from one environment to the other. An example is the purification of water, where a membrane separates waste water from purified water, where water molecules are able to pass through the membrane, leaving waste solutes behind.

Membrane technology is presently used on huge scales for the production of drinking water, the treatment of waste water, the separation of chemicals, and for biomedical applications. Many tens of millions of square meters of membrane material are produced each year, allowing for sales worth many billions of US dollars. This is striking in light of the young age of membrane technology, as just 50 years ago, membranes were only used on very small scales in laboratories and hospitals.

Historically, the big breakthrough for membrane technology came with the development of non-solvent induced phase separation (NIPS) in 1962 (Loeb, S.; DOI: 10.1021/bk-1981-0153.ch001, incorporated by reference). With NIPS it became possible to produce, in a continuous process, defect free membranes with an asymmetric structure. NIPS can be used to create membranes in the form of sheets, or in the form of hollow fibers (WO2017043233). These membranes consist of an ultrathin and highly selective skin layer but are supported by a much more permeable microporous support that provides mechanical strength. The asymmetric structure allows a flux that is a factor 10 higher than any reverse osmosis membrane developed before, while retaining excellent salt rejection characteristics. NIPS made membranes a potentially practical method for desalting water but also showed a clear path to create better and cheaper membranes for other applications. Currently, NIPS is the dominant technique to produce (polymeric) membranes, sometimes in combination with other techniques such a interfacial polymerization.

In the traditional NIPS process the starting point is a polymer such as poly(ether sulfone) (PES) dissolved in a solvent, often NMP, at a high polymer concentration. A thin film of the polymer solution is cast on a substrate and is then immersed in a suitable non-solvent (for example water). After immersion, an immediate exchange takes place where solvent diffuses into the non-solvent bath (with a given flux) and the non-solvent penetrates the film of polymer solution. The polymer solution then comes into the metastable regime and later in the unstable regime, and precipitation of the polymers can occur during both these regimes. Initially the precipitate might be in the form of a gel or a liquid-like structure, until real solidification sets in after more solvent exchange. The diluted phase, mixture of solvent and non-solvent, influences the porosity in the membrane while the solidified polymer forms the membrane matrix (Reuvers et al., J. membrane sci. 1987, 34, 45, incorporated by reference).

A strength of NIPS is that within the polymer solution the kinetics of precipitation differs for different locations. At the top of the cast polymer solution, where the initial contact is made between the solvent and the non-solvent, precipitation will be very fast leading to the formation of very small pores or even a dense skin layer. However, this precipitated surface structure slows the further exchange of solvent and non-solvent. The kinetics of precipitation deeper within the membrane will therefore be slower leading to a much more open structure. The asymmetric structure, with a very thin and highly selective skin layer, supported by a much thicker and much more open substructure is thus a common result of this approach to membrane production. Furthermore, variation in the polymer concentration, temperature and additionally the composition (solvent to non-solvent ratio) of the polymer solution and the coagulation bath, allows for control over the kinetics of precipitation and thus the resulting membrane structure.

NIPS has been successfully used to create asymmetric membranes with dense top layers for reverse osmosis, gas separation and nanofiltration, asymmetric porous films for ultrafiltration (pore size 5-100 nm) and asymmetric and symmetric porous films for microfiltration (pore size 100-1000 nm).

Unfortunately, the aprotic solvents that NIPS relies on are expensive, partly flammable and, more importantly, they can be harmful (e.g. reprotoxic) to humans and the environment. Due to costs and environmental legislation these solvents have to be recycled, requiring an expensive closed cycle of process streams. Furthermore, residual solvent has to be fully removed from the membrane before it can be used for the production of drinking water.

The complexation of oppositely charged polyelectrolytes is well known to be able to lead to an insoluble polymer phase. Polyelectrolyte complexes are already successfully used in membrane technology. They are prepared by alternatively coating a support membrane with polycations and polyanions leading to the build-up of a dense polyelectrolyte multilayer on top of the support (De Grooth, J., et al. J. Membrane Science, 2014, 475, 311, incorporated by reference). Polyelectrolyte multilayer membranes have shown excellent separation properties for reverse osmosis and nanofiltration, but possess downsides in that many time consuming coating steps are necessary for their preparation, and that a (NIPS based) support membrane is required.

It is an object of the present invention to provide improved methods for producing porous films. It is an object of the present invention to provide methods that reduce the use of organic solvents in the preparation of porous films. It is an object of the present invention to provide safer methods for producing porous films. It is an object of the present invention to provide methods with reduced impact on the environment for producing porous films. It is an object of the present invention to provide methods with reduced use of harmful substances for producing porous films.

SUMMARY OF THE INVENTION

In a first aspect the invention relates to a method for creating a porous film through aqueous phase separation, the method comprising the steps of:
I) providing an aqueous polymer solution comprising a dissolved trigger-responsive polymer;
II) contacting the aqueous polymer solution with an aqueous coagulation solution in which the trigger-responsive polymer is not soluble; and III) allowing solvent exchange between the aqueous polymer solution and the coagulation solution to form a porous film.

This method produces porous films such as membranes without the need for organic solvents. An important underlying principle is that water can act as both a solvent and as a non-solvent for certain trigger-responsive polymers, surprisingly allowing an entirely aqueous phase separation process.

For trigger-responsive polymers or combinations of polymers, a transition from soluble to insoluble is surprisingly possible in a completely aqueous environment, for example by a change in pH, temperature (T) or salt concentration (Csalt). This allows one to follow the long established procedures used for NIPS, but under completely aqueous conditions. This approach, Aqueous Phase Separation (APS) retains the key strengths of the NIPS approach, allows control over film structure, without requiring any organic solvents. This makes the approach an appealing and sustainable alternative to traditional film production.

In preferred embodiments, step II of the method comprises the further steps of IIa) applying the aqueous polymer solution on a surface to create a coated surface coated with aqueous polymer solution coating; and IIb) immersing the coated surface in a coagulation bath comprising an aqueous coagulation solution in which the trigger-responsive polymer is not soluble. Preferably, this surface is selected from the group consisting of a glass surface, a polytetrafluoroethylene (PTFE) surface, a polypropylene surface, and a porous surface such as a non-woven surface. Preferably, the coated surface comprises a support layer. Preferably, the coating is applied by casting, dropcasting, spincoating, dipcoating, printing, stamping, spraying, or pouring.

In preferred embodiments, the trigger-responsive polymer is responsive to a change in pH, a change in temperature, or a change in solute concentration.

In preferred embodiments, the trigger-responsive polymer is selected from the group consisting of poly(2-diethylaminoethylmethacrylate) (PDEA), poly(N-isopropyl-acrylamide) (PNIPAM), poly(methacrylic acid)-co-(methyl methacrylate) (PMAA-co-PMMA), poly(4-vinylpyridinium) (P4VP), poly(methacrylic acid) (PMAA), poly(acrylic acid) (PAA), poly(styrene sulfonic acid) (PSS), polyaminostyrene (PAS), poly(styrene)-co-(maleic acid) (PS-co-PMA), poly(maleic acid) (PMA), poly(vinyl sulfonic acid) (PVS), sulfonated polyethersulfone (sPES), sulfonated polysulfone (sPSU), poly(ethylene imine) (PEI), poly(allylamine) (PAH), elastin-like polypeptide (ELP), poly(2-(dimethylamino)ethyl methacrylate) (PDMAEMA), poly(diallyl-dimethyl-ammonium chloride) (PDADMAC), poly(oligoethylene glycol)acrylate (pOEA), poly(oligoethylene glycol)acrylamide (pOEAAm), poly(oligoethylene glycol)methacrylate (pOEMA), poly(oligoethylene glycol)acrylamide (pOEMAAm), sulphonated poly(ether ether ketone) (SPEEK), chitosan, and polysulfobetaine (PSBMA), or a copolymer thereof.

In preferred embodiments, the trigger-responsive polymer is a polycationic polyelectrolyte or a polyanionic polyelectrolyte, wherein the polycationic polyelectrolyte is selected from the group consisting of poly(2-diethylaminoethylmethacrylate) (PDEA), poly(4-vinylpyridinium) (P4VP), polyaminostyrene (PAS), poly(ethylene imine) (PEI), poly(allylamine) (PAH), poly(2-(dimethylamino)ethyl methacrylate) (PDMAEMA), chitosan, and poly(diallyl-dimethyl-ammonium chloride) (PDADMAC), or a copolymer thereof, and wherein the polyanionic polyelectrolyte is selected from the group consisting of poly(methacrylic acid)-co-(methyl methacrylate) (PMAA-co-PMMA), poly(methacrylic acid) (PMAA), poly(acrylic acid) (PAA), poly(styrene sulfonic acid) (PSS), poly(vinyl sulfonic acid) (PVS), sulfonated polyethersulfone (sPES), sulfonated polysulfone (sPSU), poly(styrene)-co-(maleic acid) (PS-co-PMA), sulphonated poly(ether ether ketone) (SPEEK), and poly(maleic acid) (PMA), or a copolymer thereof In preferred embodiments, the aqueous polymer solution comprises both a polycationic polyelectrolyte and a polyanionic polyelectrolyte.

In preferred embodiments, the aqueous polymer solution comprises substantially equal amounts of the polycationic polyelectrolyte and of the polyanionic polyelectrolyte, determined by monomeric ratio.

In preferred embodiments, the aqueous polymer solution comprises an excess of the polycationic polyelectrolyte or of the polyanionic polyelectrolyte, determined by monomeric ratio.

In preferred embodiments, the method further comprises the step of crosslinking the porous film. Preferably, this crosslinking is via dihaloalkanes such as 1,4-dichlorobutane or 1,6-dibromohexane, diamines such as ethane-1,2-diamine, propane-1,3-diamine, putrescine, cadaverine, hexane-1,6-diamine, aldehydes such as formaldehyde and dialdehydes, via heating of the porous film, or via radiation such as an ion beam. In preferred embodiments, the aqueous polymer solution comprises equal amounts of the polycationic polyelectrolyte and of the polyanionic polyelectrolyte, determined by monomeric ratio, and the crosslinking reduces the amount of anionic groups in the anionic polyelectrolye, or reduces the amount of cationic groups in the cationic polyelectrolyte.

In preferred embodiments, the aqueous polymer solution comprises further additives, wherein the further additives are selected from the group consisting of a polypeptide, a nanoparticle, and a macromolecule. Preferably, the porous film that is created is a catalytic film, wherein the further additive is an enzyme, a small molecule catalyst, a macromolecule, or a nanoparticle. Preferably, the porous film that is created is an ion binding or ion transporting film, wherein the further additive is a crown ether or a polypeptide known to bind or transport ions.

In preferred embodiments, the porous film that is created is an antifouling film, wherein the trigger-responsive polymer is a low-fouling polymer such as poly(oligoethylene glycol)acrylate (pOEA), poly(oligoethylene glycol)acrylamide (pOEAAm), poly(oligoethylene glycol)methacrylate (pOEMA), poly(oligoethylene glycol)acrylamide (pOEMAAm), or PSBMA.

In preferred embodiments, the porous film that is created is an anti-viral film or anti-microbial film, wherein the aqueous polymer solution comprises further additives selected from the group consisting of anti-microbial nanoparticles such as silver nanoparticles and stabilized silver nanoparticles, anti-microbial polypeptides, and anti-microbial macromolecules.

In preferred embodiments, the porous film that is created is an asymmetric porous film. Preferably, the method comprises the additional steps of: selecting a suitable concentration for the trigger-responsive polymer, or selecting a suitable temperature for step II), or selecting a suitable temperature for step III), or selecting a suitable coagulation solution.

In a second aspect, the invention relates to the porous films that are obtainable by a method of the first aspect.

Preferably, these films are porous membranes or asymmetric porous membranes. They can be two-dimensional films or hollow fibres.

DETAILED DESCRIPTION OF THE INVENTION

In a first aspect the invention relates to a method for creating a porous film through aqueous phase separation, the method comprising the steps of:
I) providing an aqueous polymer solution comprising a dissolved trigger-responsive polymer;
II) contacting the aqueous polymer solution with an aqueous coagulation solution in which the trigger-responsive polymer is not soluble; and
III) allowing solvent exchange between the aqueous polymer solution and the coagulation solution to form a porous film.

This method is referred to hereinafter as a method according to the invention. The porous films that are created with such a method are referred to herein as porous films according to the invention.

The method according to the invention produces porous films such as membranes without the need for organic solvents. A porous film is a film that has pores. In the context of this invention a pore is a small opening in the material constituting the film. A pore can be open to both faces of a film, spanning the thickness of the film and forming a transecting void space. A pore can also be open to only a single side of the film, thus forming a cavity that does not transect the film. The section of a pore can be round, substantially round, elliptical, substantially elliptical, or irregularly shaped. Pores can have an average diameter of at least 0.1, 0.2, 0.3, 0.4, 0.5, 0.6, 0.7, 0.8, 0.9, 1, 1.1, 1.2, 1.3, 1.4, 1.5, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 nm or more. Preferably, pores have an average diameter of at most 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 nm, or of 2, 3, 4, 5, 6, 7, 8, 9, 10, 11, 12, 13, 14, 15, 20, 30, 40, 50, 60, 70, 80, 90, 100 µm or more. The average diameter of a pore is preferably measured over its largest internal diameter.

In the context of this invention, a film is a polymer layer, optionally comprising further materials. The layer preferably has a minimum thickness of 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000, 1100, 1200, 1300, 1400, or 1500 µm or more. The layer preferably has a maximum thickness of 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 µm or of 2, 3, 4, 5, 6, 7, 8, 9, 10 mm, or of 1.5, 2, 2.5, 3, 3.5, 4, 4.5, or 5 cm or more. Preferably the layer has a thickness of 10-1000 µm, more preferably of 20-500 µm, 50-500 µm, 50-400 µm, or of 100-300 µm.

In the context of this invention, a film can be a predominantly or entirely flat or curved sheet or disc or other continuous surface. A film can also have two distinct surface faces, such as an interior and an exterior face, for example for a hollow fibre, a hollow corrugated fibre, a hollow tube, a hollow corrugated tube, or other shapes enclosing a volume. The porous films according to the invention can be further processed after performing the method according to the invention to obtain particular shapes. This further processing can be done via cutting, stamping, or any method known in the art.

The method according to the invention relies on aqueous phase separation (APS), which is the occurrence of phase separation in a multicomponent aqueous mixture induced by a change in a parameter of the aqueous mixture, such as its pH, its temperature, or the concentration of a solute, such as its salt concentration or ionic strength. An important underlying principle is that water can act as both a solvent and as a non-solvent for certain trigger-responsive polymers, surprisingly allowing an entirely aqueous phase separation process. FIG. 1 schematically illustrates the APS process. In the context of this invention, phase separation is the transition of at least part of the dissolved trigger-responsive polymer to an eventual solid or gel state, the solid or gel polymer forming the porous film. Preferably the film according to the invention is solid.

For trigger-responsive polymers or combinations of polymers, a transition from soluble to insoluble is surprisingly possible in a completely aqueous environment, for example by a change in a parameter of the multicomponent mixture, wherein the parameter is selected from the group consisting of pH, temperature (T), and solute concentration (Csol) such as salt concentration (Csalt) or acid concentration (Cacid). This allows one to follow the long established procedures used for NIPS, but under completely or at least substantially aqueous conditions. APS retains the key strengths of the NIPS approach, allows control over film structure, without requiring any organic solvents. This makes the approach an appealing and sustainable alternative to traditional film production.

In the context of this invention, aqueous is to be construed as being predominantly water-based. Given how it is an object of the invention to reduce the need for organic solvents, preferably water is the only solvent in the multi-component aqueous mixture. However, as some organic solvents may have beneficial effects as additives, the may nonetheless be present. Accordingly, throughout this application, the term aqueous refers to a solution wherein at least 50, 60, 70, 80, 90, 91, 92, 93, 94, 95, 96, 97, 98, 98.2, 98.4, 98.6, 98.8, 99, 99.1, 99.2, 99.3, 99.4, 99.5, 99.6, 99.7, 99.8, 99.9, or more percent of the solvent is water, or wherein substantially 100% of the solvent is water.

In step I of the method according to the invention an aqueous polymer solution comprising a dissolved trigger-responsive polymer is provided. The provision of such an aqueous polymer solution can be via any method known in the art. A suitable polymer can be separately provided and dissolved in a suitable aqueous solution, a suitable polymer can be polymerized from its constituent monomers in a suitable aqueous solution, or an aqueous polymer solution can be procured from a commercial source.

In the context of this invention, a solution is a mixture comprising at least water and a trigger-responsive polymer, wherein at least part of the trigger-responsive polymer is dissolved in the aqueous polymer solution, preferably at least 70, 75, 80, 85, 90, 95, 96, 97, 98, 99, or 100% of the trigger-responsive polymer is dissolved in the aqueous polymer solution. Preferably, it is a homogeneous mixture, but it can also be a suspension or an emulsion. In preferred embodiments, no non-dissolved components are present.

The aqueous polymer solution comprises a dissolved trigger-responsive polymer. In the context of this invention a trigger-responsive polymer is a polymer that responds to a trigger by changing its solubility, preferably decreasing it. Preferably, it has the ability to respond dramatically to an external trigger such as pH, temperature or ionic strength. An example of this is the polymer poly(4-vinylpyridinium) (P4VP) which is hydrophobic and insoluble in water, except below pH 3 when it becomes charged and as a result hydrophilic.

In preferred embodiments, the aqueous polymer solution comprises 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 60, 70, 80, 90 or more percent by weight of the trigger-responsive polymer. More preferably, about 10-40 percent by weight is comprised.

A trigger in this case is preferably a change in a parameter selected from the group consisting of pH, temperature (T), and solute concentration (Csol) such as salt or acid concentration (Csalt). A polymer that changes its solubility is said to respond to the trigger. The change can be either an increase or a decrease. A skilled person will be able to establish how a trigger-responsive polymer responds to changes in a particular parameter. A change in solubility leads to a change in opacity of the aqueous polymer solution, and can for example be monitored via uv-vis transmission spectroscopy. The change in solubility allows the dissolved trigger-responsive polymer to no longer be dissolved, forming a film. In preferred embodiments, a trigger-responsive polymer precipitates or forms a gel in response to its trigger, or at least undergoes a phase transition in response to its trigger.

Examples of trigger-responsive polymers are poly(2-diethylaminoethylmethacrylate) (PDEA), poly(N-isopropylacrylamide) (PNIPAM), poly(methacrylic acid)-co-(methyl methacrylate) (PMAA-co-PMMA), poly(4-vinylpyridinium) (P4VP), poly(methacrylic acid) (PMAA), poly (acrylic acid) (PAA), poly(styrene sulfonic acid) (PSS), polyaminostyrene (PAS), poly(styrene)-co-(maleic acid) (PS-co-PMA), poly(maleic acid) (PMA), poly(vinyl sulfonic acid) (PVS), sulfonated polyethersulfone (sPES), sulfonated polysulfone (sPSU), poly(ethylene imine) (PEI), poly(allylamine) (PAH), elastin-like polypeptide (ELP), poly(2-(dimethylamino)ethyl methacrylate) (PDMAEMA), poly(diallyl-dimethyl-ammonium chloride) (PDADMAC), poly(oligoethylene glycol)acrylate (pOEA), poly(oligoethylene glycol)acrylamide (pOEAAm), poly(oligoethylene glycol)methacrylate (pOEMA), poly(oligoethylene glycol) acrylamide (pOEMAAm), sulphonated poly(ether ether ketone) (SPEEK), chitosan, and polysulfobetaine (PSBMA), or a copolymer thereof. A copolymer is a polymer that comprises a further monomer in addition to a first monomer. The monomers can be present in any molar ratio, such as a 1:1 ratio or a 1:2 ratio. A copolymer can be a block copolymer where continuous stretches of the first monomer are linked to continuous stretches of the further monomer, or it can be a statistical copolymer where the different monomers alternate. Schematic representations of these polymers are provided below, with the name being given below a representation a polymer's repeating unit.

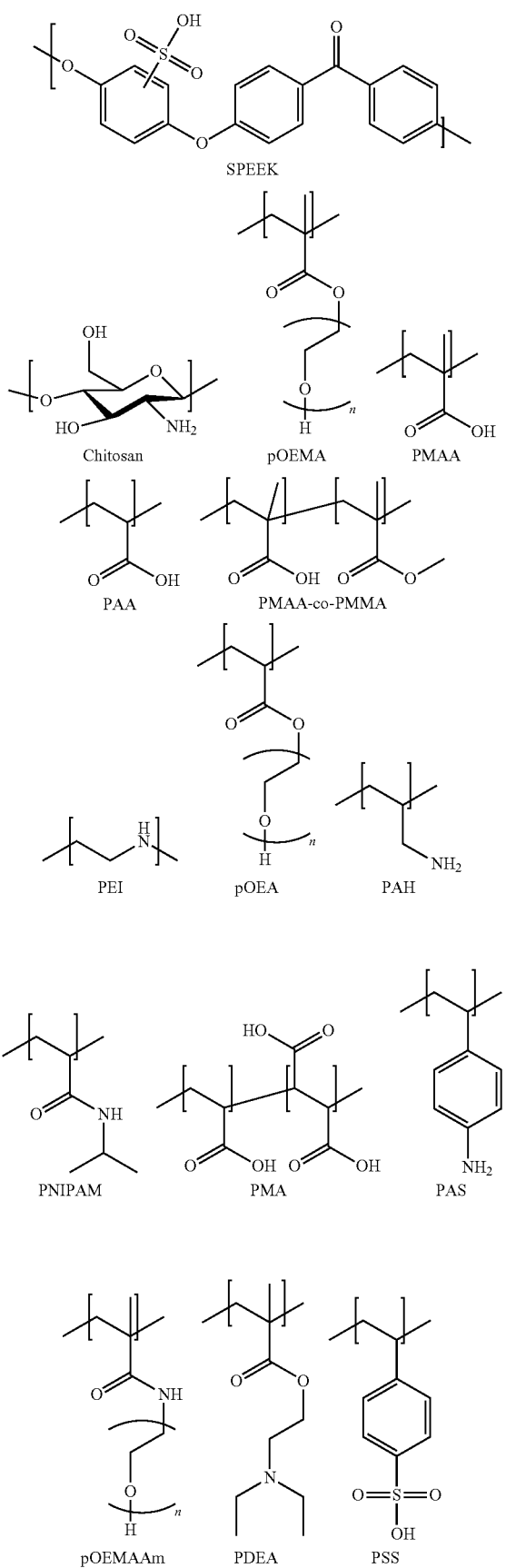

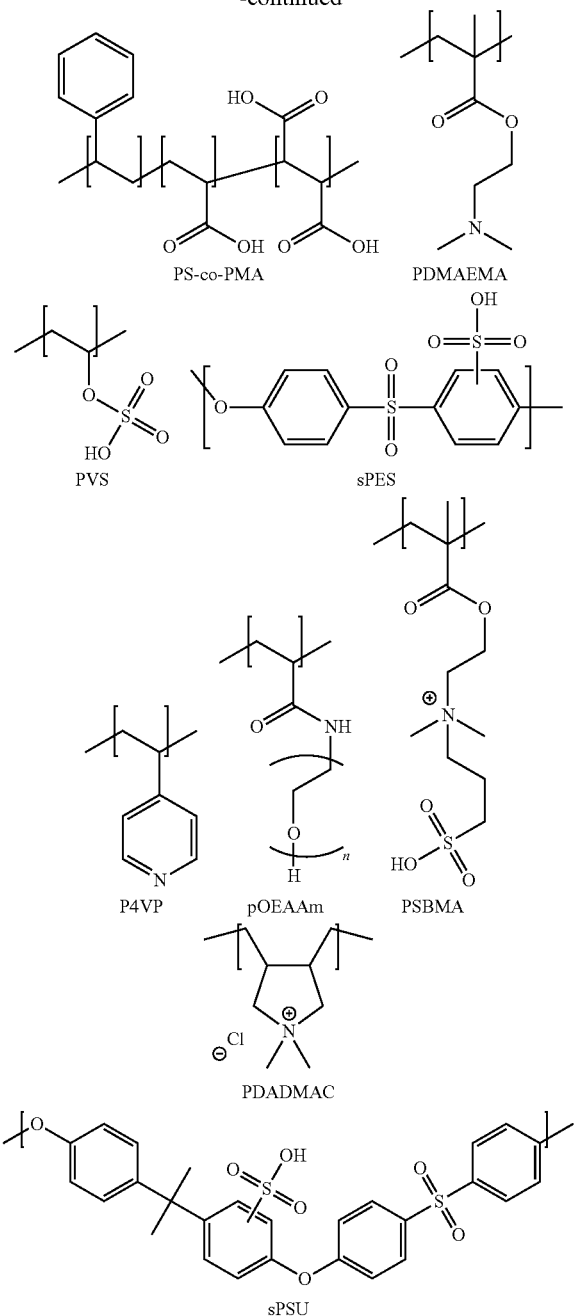

The general structure of an ELP is (VPGXG)n, where the monomeric unit is the pentapeptide Val-Pro-Gly-Aax-Gly, wherein "Aax" denotes a variable amino acid. The "n" denotes the number of monomeric units that comprise the polymer. As for all trigger-responsive polymers for use in the invention, the length of the polymer has an influence on the exact trigger. A skilled person can determine a suitable polymer length by assessing the response of a trigger-responsive polymer of a certain length as described above. Conversely, the trigger point of a polymer of a given length can be assessed by routine experimentation.

A preferred trigger is an increase or decrease in temperature by at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60, 65, 70, 75, 80, 85, 90, 95, or 100 degrees Celsius or more. A skilled person can establish a suitable temperature difference by assessing the response of a trigger-responsive polymer as described above. Examples of trigger-responsive polymers that respond to a change in temperature are polymers that have a known lower critical solution temperature (LCST) or upper critical solution temperature (UCST). Examples of such polymers are PNIPAM, PDMAEMA, poly(oligoethylene glycol)acrylate (pOEA), poly(oligoethylene glycol)acrylamide (pOEAAm), poly(oligoethylene glycol)methacrylate (pOEMA), poly(oligoethylene glycol)acrylamide (pOEMAAm), and ELP, or copolymers thereof.

A further preferred trigger is an increase or decrease in pH by at least 0.1, 0.2, 0.3, 0.4, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.5, 6.0, 6.5, 7.0, 7.5, 8.0, 8.5, 9.0, 9.5, or 10.0, 10.5, 11.0, 11.5, 12.0, 12.5, 13.0, 13.5, or 14.0 units or more. Preferably, such an increase or decrease is in the range of 2 to 6 pH units, more preferably in the range of 3 to 4 pH units. A skilled person can establish a suitable pH difference by assessing the response of a trigger-responsive polymer as described above, and by taking account of $pK_a$ values of the trigger-responsive polymer. Examples of such polymers are PDEA, P4VP, PAS, PEI, PAH, PDMAEMA, PDADMAC, PMAA-co-PMMA, PMAA, PAA, PSS, PVS, sPES, sPSU, PS-co-PMA, PMA, or copolymers thereof.

A further preferred trigger is an increase or decrease in solute concentration such as salt concentration by at least 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 mM, or 1, 1.5, 2, 2.5, 3, 3.5, 4, 4.5, 5, 5.5, 6, 6.5, 7, 7.5, or 8 M or more. Preferably a difference in salt concentration is at most 6 M or 5 M, such as from 0 M to 5 M, or from 5 M to 0 M. Examples of suitable salts are NaCl, KCl, $Na_3PO_4$, $Na_2HPO_4$, $NaH_2PO_4$, a calcium phosphate, apatites such as hydroxylapatite, $NaCO_3$, $NaHCO_3$, $KHSO_4$, $CsCO_3$, $Na_2SO_4$, $K_2SO_4$, $NaHSO_4$, $MgSO_4$, $MgCL_2$, $CaCl_2$, $CaCO_3$. A skilled person can establish suitable salts and concentration differences by assessing the response of a trigger-responsive polymer as described above. Examples of such polymers are chitosan, PSBMA, and PDADMAC, or copolymers thereof. Salt concentration is a preferred trigger when more than one trigger-responsive polymer is present in the aqueous polymer solution, preferably when oppositely charged polyelectrolytes are present, more preferably in a 1:1 ratio based on monomers as described elsewhere herein. Examples of combinations of trigger-responsive polymers in this context are PDADMAC and PSS, PAH and PSS, PEI and PSS, and PDADMAC and PAA. PDADMAC and PSS is particularly preferred.

A further preferred trigger is an increase or decrease in solute concentration such as acid concentration by at least 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 mM or more. Examples of suitable salts are acetic acid, phosphoric acid, trifluoroacetic acid, formic acid, propionic acid, citric acid, glycolic acid, trichloroacetic acid, tosylic acid, mesylic acid, and other sulphates or carboxylates with a molecular weight of less than 500, 400, 300, 250, or 200 Da. A skilled person can establish suitable acid and concentration differences by assessing the response of a trigger-responsive polymer as described above.

Preferably, upon response to a trigger, at least 50, 60, 70, 80, 90, 91, 92, 93, 94, 95, 96, 97, 98, 98.2, 98.4, 98.6, 98.8, 99, 99.1, 99.2, 99.3, 99.4, 99.5, 99.6, 99.7, 99.8, 99.9, or 100% percent of a trigger-responsive polymer undergoes a phase transition. This can be immediately after the trigger occurs, or within at least 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 55, 60 seconds, or 2, 3, 4, 5, 6, 7, 8, 9, 10, 15, 30, 45 minutes, or 1, 2, 3, 4, 5, 6, 7, 8, 9, 11, 12, or 24 hours or more. The amount of polymer that underwent a phase transition can be assessed by quantifying the amount of polymer that is still in solution after the trigger has occurred, for example via uv-vis techniques, or via chromatography such as HPLC or GPC.

In a second step of the method according to the invention, the aqueous polymer solution is contacted with an aqueous coagulation solution in which the trigger-responsive polymer is not soluble. In the context of this invention, the trigger-responsive polymer is considered to not be soluble if its solubility in the aqueous coagulation solution is at least 1, 5, 10, 15, 20, 25, 30, 35, 40, 45, 50, 55, 60, 65, 70, 75, 80, 85, 90, 95, or 100 percent lower when expressed using the same mass per volume solubility ratio. Solubility can for example be determined by preparing a saturated solution of a known volume in a given solvent, and then evaporating or lyophilising the solvent, after which the residual solids are weighed.

The aqueous coagulation solution is aqueous as described above for the aqueous polymer solution. It induces the phase transition of the dissolved trigger-responsive polymer, for example coagulating it. The nature of the aqueous coagulation solution depends on the aqueous polymer solution and the trigger-responsive polymer. The aqueous coagulation solution can be a solution that besides not having a dissolved trigger-responsive polymer is identical to that of the aqueous polymer solution, but differing in only a single further parameter. For example, the aqueous coagulation solution can be warmer or colder, the aqueous coagulation solution can be more acidic or more basic (that is: have a lower pH or a higher pH), or aqueous coagulation solution can have a higher or a lower concentration of a particular solute such as a salt.

Generally it will be convenient if the aqueous polymer solution is a bath, in the sense of a volume whose parameters do not substantially change when exposed to, and eventually equilibrated with, a smaller volume such as the volume of the aqueous polymer solution. Preferably the volume of a bath is at least 2, 5, 10, 20, 30, 40, 50, 100, 150, 200, 250, 500, 750, or 1000 times as large as the volume of the aqueous polymer solution. As such, contacting an aqueous polymer solution with an aqueous coagulation solution substantially changes the parameters of the aqueous polymer solution to those of the aqueous coagulation solution. This preferably provides a trigger for a trigger-responsive polymers dissolved in the aqueous polymer solution. Suitable triggers are described above. Based on these parameters, a suitable aqueous coagulation solution can be selected.

The aqueous polymer solution is contacted with the aqueous coagulation solution. This contacting can be as simple as submerging the aqueous polymer solution in a bath or volume of the aqueous coagulation solution. This is particularly suitable for forming porous films in the shape of a sheet or surface. Alternately, the aqueous polymer solution can be injected into the aqueous coagulation solution. This is particularly suitable for forming porous films in the shape of a hollow fibre, reed, or tube, or corrugated versions thereof.

In hollow fibre spinning, a circular spinneret can be used for the creation of hollow fibres with smooth or substantially smooth surfaces, and with a substantially circular cross section. Alternately a modified spinneret can be used, which has a non-circular cross section, resulting in hollow fibres with a matching shape. Alternately a modified spinneret can be used, which has defined structures at its outlet. Such defined structures can create a defined structure at the outside of the created hollow fibre, at the inside of the created hollow fibre, or at both the inside or the outside of the hollow fibre. As a non-limiting example, such a modified spinneret can have protrusions on its outermost circumference pointing into of its outlet. This leads to corrugations along the length of the outer surface of a hollow fibre spun with such a spinneret. Such corrugations can improve fibre strength, whilst membrane properties remain substantially unchanged.

In preferred embodiments, step II of the method comprises the further steps of IIa) applying the aqueous polymer solution on a surface to create a coated surface coated with aqueous polymer solution coating; and IIb) immersing the coated surface in a coagulation bath comprising an aqueous coagulation solution in which the trigger-responsive polymer is not soluble. Preferably, this surface is selected from the group consisting of a glass surface, a plastic surface such as a polytetrafluoroethylene (PTFE) surface or a polypropylene surface, a ceramic surface, a metal surface, a porous surface such as a non-woven surface, and surfaces that are preformed membranes of membrane materials known in the art such as PES, PSU, polyvinylidene difluoride (PVDF), poly(vinyl chloride) (PVC), polyether ether ketone (PEEK), cellulose, and ceramics. Preferably, the coated surface comprises a support layer. Preferably, the coating is applied by casting, dropcasting, spincoating, dipcoating, printing, stamping, spraying, or pouring.

In step IIa the aqueous polymer solution is applied on a surface to create a coated surface. The coated surface is thus a surface, sometimes referred to as a substrate, that is coated with said aqueous polymer solution, forming an aqueous polymer solution coating. The creation of coated surfaces is known in the art, as are surfaces that are suitable to be coated. Examples of suitable surfaces are surfaces made of glass, quartz glass, ceramics, plastics such as high density polyethylene, polypropylene, PTFE, or polystyrene, metals and alloys such as titanium, steel, or aluminium, surfaces that are preformed membranes of membrane materials known in the art such as PES, PSU, polyvinylidene difluoride (PVDF), poly(vinyl chloride) (PVC), polyether ether ketone (PEEK), cellulose, and ceramics, and porous surfaces such as non-woven surfaces, for example non-woven rayon, polyethylene terephthalate (PET), polypropylene, cotton, polyester, PVDF, PVC, or fibreglass. A glass surface is very suitable. A porous surface is suitable if it is desired that the porous film is not later separated from the surface, for example when it is desired for the surface to impart mechanical strength to the porous film.

Similarly, techniques for applying a coating are well known, and any technique can be used to apply an aqueous polymer solution on a surface to form an aqueous polymer solution coating. Examples of suitable coating techniques are casting such as spin casting or drop casting, pouring, printing, stamping, spraying, spin coating, and dip coating.

In step IIa the aqueous polymer solution forms a coating on the surface. Preferably, the shape of the coating determines the shape of the porous film that is formed. The coating preferably has a minimum thickness of 1, 2, 3, 4, 5, 10, 15, 20, 25, 30, 35, 40, 45, 50, 60, 70, 80, 90, 100, 110, 120, 130, 140, 150, 160, 170, 180, 190, 200, 210, 220, 230, 240, 250, 260, 270, 280, 290, 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000, 1100, 1200, 1300, 1400, or 1500 µm or more. The coating preferably has a maximum thickness of 300, 310, 320, 330, 340, 350, 360, 370, 380, 390, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, or 1000 µm or of 2, 3, 4, 5, 6, 7, 8, 9, 10 mm, or of 1.5, 2, 2.5, 3, 3.5, 4, 4.5, or 5 cm or more. Preferably the coating has a thickness of 10-1000 µm, more preferably of 20-500 µm, 50-500 µm, 50-400 µm, or of 100-300 µm.

In step IIb the coated surface is immersed in a coagulation bath comprising an aqueous coagulation solution in which the trigger-responsive polymer is not soluble. A coagulation bath is a volume of aqueous coagulation solution as described earlier herein. This immersion can be in any way, for example by dipping the coated surface in a volume of coagulation solution, or by filling a volume with coagulation solution, wherein the coated surface was already present in the volume.

In step III solvent exchange takes place between the aqueous polymer solution and the coagulation solution, providing a trigger to the trigger-responsive polymer and inducing phase transition of the trigger-responsive polymer. This leads to the formation of a porous film as defined earlier herein. Triggers and the provision thereof are also defined earlier herein. The initial polymer concentration and kinetics of the immersion are important to the eventual porous structure that is formed (Reuvers et al., J. membrane sci. 1987, 34, 45, incorporated by reference). When coagulation is very fast, the trigger-responsive polymers in the aqueous polymer solution coating have only little time to undergo phase transition, and a structure with small surface pores is formed. Very quick phase transition at high polymer concentrations can even lead to the formation of a dense skin layer. Conversely, when the aqueous polymer solution coating is given more time to undergo phase transition, the pores have more time to grow bigger, halting their growth when solidification sets in.

Just as in traditional NIPS, the kinetics of solvent exchange can be controlled to create films with different structures. Examples of parameters that are of influence on resulting film structure are the concentration of trigger-responsive polymer in the aqueous polymer solution, the temperature of the coated surface, the temperature at which solvent is exchanged, the pH of the aqueous polymer solution, and the pH of the aqueous coagulation solution. $H_3O^+$ and $OH^-$ have extremely high diffusion speeds due to their small size, and have the possibility to be conducted through a hydrogen bond network. This means that pH-responsive polymers allow a wide variety of coagulation kinetics and thus allow a wide variety of membrane structures to be formed. Accordingly pH is a preferred trigger for trigger-responsive polymers. A person skilled in NIPS will be able to adapt traditional NIPS process parameters to the method according to the invention.

In allowing solvent exchange between the aqueous polymer solution and the coagulation solution, the trigger is provided to the trigger-responsive polymer, inducing phase separation. As described above, the kinetics of this solvent exchange can influence the architecture of the resulting porous film. In preferred embodiments, the porous film that is created is an asymmetric porous film. The asymmetry in this context is along the thickness of the film, because the initial contact surface of the aqueous polymer solution coating can have a more immediate solvent exchange with the coagulation solution, leading to more rapid phase separation. For example, the initially coagulated top part of the film can reduce the tempo with which deeper regions of the coating undergo solvent exchange, leading to slower phase separation and thus to larger cavities and therefore to larger pores. These concepts are known from conventional NIPS, and a skilled person will know how to determine suitable solvent exchange parameters to obtain particular architectures.

Preferably, the method comprises the additional steps of: selecting a suitable concentration for the trigger-responsive polymer, or selecting a suitable temperature for step II), or selecting a suitable temperature for step III), or selecting a suitable coagulation solution. Optionally, the method comprises the additional steps of: selecting a suitable surface for step II), or selecting a suitable support layer.

Preferably, steps I, II, and III of the method according to the invention are preformed sequentially in that order. Preferably, steps I, IIa, IIb, and III of the method according to the invention are performed sequentially in that order.

Optionally, the method according to the invention comprises a step IV, which entails removing the porous film from the surface that was originally coated with the aqueous polymer solution coating. In removing the porous film from the surface it becomes a free standing porous film. In preferred embodiments, the surface may have comprised a support layer; in such cases the porous film is only removed from the surface together with the support layer, forming a single multi-layered material. Removing a film from a surface can be done via any method known in the art such as peeling, lifting, rolling, and soaking with a suitable liquid. Examples of suitable liquids are water or alcohols such as $C_1$-$C_4$ alkanols such as ethanol.

A support layer can provide additional characteristics to a porous film according to the invention. For example it can provide mechanical strength by using a support layer with good mechanical properties, ease of handling by using a support layer with known features, ease of identification through colour use or by using a support layer with pre-printed text or imagery, and protection by using a support layer that is intended to be removed prior to use of the porous film. Examples of support layers are known protective films such as HDPE, or known porous materials with good mechanical strength such as non-woven materials. Preferably the porosity of the non-woven is of such an extent that it does not influence the effect of the porosity of the porous film; for example, it is preferred that the non-woven has pores that are significantly larger than pores of the porous film, so that the filtration properties of the resulting membrane remain similar despite the presence of the non-woven support.

In preferred embodiments, the trigger-responsive polymer is a polycationic polyelectrolyte or a polyanionic polyelectrolyte, wherein the polycationic polyelectrolyte is selected from the group consisting of poly(2-diethylaminoethylmethacrylate) (PDEA), poly(4-vinylpyridinium) (P4VP), polyaminostyrene (PAS), poly(ethylene imine) (PEI), poly (allylamine) (PAH), 2-(dimethylamino)ethyl methacrylate) (PDMAEMA), chitosan, and poly(diallyl-dimethyl-ammonium chloride) (PDADMAC), or a copolymer thereof, and wherein the polyanionic polyelectrolyte is selected from the group consisting of poly(methacrylic acid)-co-(methyl methacrylate) (PMAA-co-PMMA), poly(methacrylic acid) (PMAA), poly(acrylic acid) (PAA), poly(styrene sulfonic acid) (PSS), poly(vinyl sulfonic acid) (PVS), sulfonated polyethersulfone (sPES), sulfonated polysulfone (sPSU), poly(styrene)-co-(maleic acid) (PS-co-PMA), sulphonated poly(ether ether ketone) (SPEEK), and poly(maleic acid) (PMA), or a copolymer thereof. In the context of this invention, a polyelectrolyte is a polymer wherein at least some of its repeating units bear a charged moiety. Preferably at least about 50%, 75%, 90%, or all polymerized monomers bear a charged moiety.

In preferred embodiments, the aqueous polymer solution comprises both a polycationic polyelectrolyte and a polyanionic polyelectrolyte. Preferably, at least one weak polyelectrolyte for which the charge depends on the pH is combined with a polyelectrolyte of opposite overall charge. At a pH where the weak polyelectrolyte is uncharged, an aqueous polymer solution can be prepared without complexation of the oppositely charged polyelectrolytes taking place. A coating of the mixed polymer solution can then for example be cast on a surface and immersed in a coagulation, wherein the aqueous coagulation solution has a pH that would render the weak polyelectrolyte charged. This induces complexation and subsequently coagulation and phase transition, leading to the formation of a porous film. As with methods described above, control over the kinetics will determine the eventual porous structure.

The mixing ratio between the oppositely charged polyelectrolytes is important. A 1:1 ratio of oppositely charged monomers will result in a material having a (net) neutral charge. By having an excess of negative or positive charge, the formation of charged membranes is possible. Such charged membranes are useful for the rejection of charged moieties (e.g. ions, proteins) for example in filtration applications.

Accordingly, in preferred embodiments, the aqueous polymer solution comprises substantially equal amounts of the polycationic polyelectrolyte and of the polyanionic polyelectrolyte, determined by monomeric ratio. This is to ensure that the oppositely charged polyelectrolytes will form films without an overall positive or negative charge. In more preferred embodiments, the aqueous polymer solution comprises equal amounts of the polycationic polyelectrolyte and of the polyanionic polyelectrolyte, determined by monomeric ratio.

Accordingly, in preferred embodiments, the aqueous polymer solution comprises an excess of the polycationic polyelectrolyte or of the polyanionic polyelectrolyte, determined by monomeric ratio. For example, there can be an excess of 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 20, 25, 30, 35, 40, 45, 50 percent or more of one type of polyelectrolyte, determined by monomeric ratio.

Many porous films as formed by APS, such as polyelectrolyte complexes, are chemically stable and robust. For porous films with a relatively low stability crosslinking can be used to add mechanical strength and stability. In the context of this invention crosslinking is the creation of a bond between side chains of different polymers, to form connections between different chains. Crosslinking as such is known in the art.

Accordingly, in preferred embodiments, the method further comprises the step of crosslinking the porous film. Preferably, this crosslinking is via dihaloalkanes such as 1,4-dichlorobutane or 1,6-dibromohexane, diamines such as ethane-1,2-diamine, propane-1,3-diamine, putrescine, cadaverine, hexane-1,6-diamine, aldehydes such as formaldehyde and dialdehydes, via heating of the porous film, or via radiation such as an ion beam.

Crosslinking via a reactive molecule, referred to as a crosslinking agent, is attractive because the choice of agent allows for control over the crosslinking process. A crosslinking agent has more than one reactive group and can have two, three, four, or more different reactive groups. Such agents are known in the art. Examples of suitable crosslinking agents are dihaloalkanes, diamines, dicarboxylic acids, diacrylates, aldehydes such as formaldehyde and dialdehydes, and other molecules featuring two or more Michael acceptors. Crosslinking agents can have more than one different reactive moiety, such as an agent comprising an amine and an acryl ester, or comprising an aldehyde and a carboxylic acid. Alkanes are suitable scaffold moieties for crosslinking agents due to their plain structure and predictable structure-activity relationship, but other scaffold moieties such as aryl, heteroaryl, cyclyl, heterocyclyl, and peptide moieties can be used.

Dihaloalkanes are crosslinking agents that are suitable for reacting with nucleophilic groups, and that can be used for reducing the overall positive charge of a film. Preferred halogens are chlorine and bromine. Examples of preferred dihaloalkanes are 1,3-dichloropropane, 1,4-dichlorobutane, 1,5-dichloropentane, 1,6-dichlorohexane, 1,3-dibromopropane, 1,4-dibromobutane, 1,5-dibromopentane, and 1,6-dibromohexane. Diamines are crosslinking agents that are suitable for reacting with carboxylic esters or electrophiles, and that can be used to reduce the overall negative charge of a film. Examples of preferred diamines are ethane-1,2-diamine, propane-1,3-diamine, putrescine, cadaverine, and hexane-1,6-diamine. Aldehydes and dialdehydes are crosslinking agents that are suitable for reacting with nucleophilic groups such as amines, and that can be used for reducing the overall positive charge of a film. Examples of preferred aldehydes and dialdehydes are formaldehyde, glutaraldehyde, and phthalaldehyde. Crosslinking agents as described herein can be optionally substituted with $C_1$-$C_4$ alkanes, $C_1$-$C_4$ alkenes, $C_1$-$C_4$-alkoxy, hydroxyl moieties, and other moieties.

Crosslinking by heating is preferred when the method according to the invention is for producing a neutral membrane. For example, for certain polymer combinations complexed $COO^-$ and $NH_3^+$ moieties will form an amide bond at temperatures above 180° C. The simultaneous conversion of both an anionic and a cationic moiety helps ensure the overall neutral character of the resulting porous film.

In preferred embodiments, the aqueous polymer solution comprises equal amounts of the polycationic polyelectrolyte and of the polyanionic polyelectrolyte, determined by monomeric ratio, and the crosslinking reduces the amount of anionic groups in the anionic polyelectrolye, or reduces the amount of cationic groups in the cationic polyelectrolyte. This is to create an excess of one particular type of charge in the membrane. For example, a diamine crosslinking agent can be used to connect two carboxylic acid groups. This shifts the charge balance in the membrane by only eliminating polyanionic moieties, leaving originally complexed polycationic moieties intact to contribute to the overall charged character of the formed film. Such cross-linked and highly charged membranes are very favourable for reverse osmosis applications or for solvent resistant nanofiltration (SRNF).

As the main building block of the method according to the invention is a trigger-responsive polymer, the resulting films can retain certain responsive properties, forming responsive films such as responsive membranes. Here a trigger such as a change in pH or ionic strength can provide control over film properties, such as the separation properties of a porous membrane. Alternately, switching a film between a hydrophobic and a hydrophilic state can aid with membrane cleaning. Within the method according to the invention, the crosslink density of a crosslinked membrane will result in control over how much of the responsive behaviour of the constituent trigger-responsive polymers remains after a porous film is formed. At high crosslink density, hardly any responsive behaviour is to be expected. At lower crosslink density more responsive behaviour remains. In preferred embodiments, the crosslinking is to such an extent that the original trigger that induced the phase change of the trigger-responsive polymer no longer induces such a phase change. This can be determined via routine optimisation, for example by crosslinking to a certain degree and then exposing a formed crosslinked porous film to the same aqueous solution that was used in step I of the method, after which film integrity is assessed, for example via mechanical stress tests.

Preferably the degree of crosslinking is expressed as the degree percentage of polymer side chains that have formed a link with a further side chain, forming a crosslink. In preferred embodiments, at least 0.01, 0.02, 0.03, 0.04, 0.05, 0.06, 0.07, 0.08, 0.09, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 11, 12, 13, 14, 15, 20, 25, 30, 35, 40, 45, 50, 55, 60, 65, 70% or more of the side chains have formed crosslinks. In preferred embodiments, a crosslinking solution comprises at least 0.01, 0.02, 0.03, 0.04, 0.05, 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 3, 4, 5, 6, 7, 8, 9, 10, 11, 12, 13, 14, 15, 20, 25, 30, 35, 40, 45, 50, 55, 60, 65, 70% by weight of crosslinking agent. Crosslinking is preferably performed for at least 1, 2, 3, 4, 5, 6, 7, 8, 9, 10, 15, 30, 45, 60 90, 120, 180, 240, 300, 360, 420, 480, 540, 600, or more minutes, and preferably for no more than 1, 2, 3, 4, 5, 6, 7, 8, 9, 10, 11, 12, 13, 14, 15, 16, 17, 18, 24, 36, 72, 96, or more hours.

Properties of the porous films according to the invention can be assessed using known techniques, for example optical techniques such as ellipsometry and optical coherence tomography to study the swelling and stability of porous films when exposed to water, solvents, and gasses. Zeta-potential and contact angle measurements, in combination with SEM, EDX, AFM, porometry and FTIR can be used to determine the structure and properties of the new films. Mechanical properties can be determined by tensile strength measurements, while TGA will allow thermal investigations. Filtration efficiency can be determined using analysis such as UHPLC, UV spectrophotometry, and ion chromatography by determining exact concentrations of test molecules before and after membrane filtration. Membrane fouling can be mainly studied by flux decline under a fixed pressure, while subsequent back-flushing will allow one to distinguish between reversible and irreversible fouling. Optical coherence tomography allows one to visualize thicker fouling layers. For virus retention and in-activation measurements a plaque assay can be used in combination with RNA extraction, while for tests with bacteria a plate count can be used in combination with dye-assisted microscopy to inspect the membrane surface to count live and dead bacteria.

In conventional NIPS an important approach to creating advanced membranes is blending: in the context of this invention blending is the addition of a minority component, for example a further polymer, to the polymer solution. During phase separation this additive is entrapped in the formed film, leading for example to hydrophilic, low fouling, or responsive membranes (Wandera, D.; Wickramasinghe, S. R.; Husson, S. M. J. Membrane Sci., 2010, 357, 6, incorporated by reference). In NIPS, the choice of additives is severely limited due to polymer incompatibility. For polymers, just a very small amount of unfavourable interaction per monomer is enough to induce unwanted phase separation between polymer and additive (see FIG. 2a). Polymer incompatibility is thus another limitation of NIPS as it often makes blending of more advanced ingredients impossible.

An advantage of the method according to the invention is that polymer incompatibility can be circumvented, and that blending of further ingredients can be integrated in the process without leading to incomplete blending through unwanted phase separation within the film. For example, in various methods according to the invention at least one trigger-responsive polymer is charged. Charged polymers generally do not show phase separation due to polymer incompatibility when mixed with an additional polymeric component: for charged polymers, phase separation is unfavourable as it would bring charged chains that strongly repel each other close together. As an additional positive result of this, the mixing of additives with charged polymers is generally favourable, as schematically shown in FIG. 2b. When a third component with a higher or lower charge density is added, for example an enzyme, full mixing remains the most favourable option to achieve distance between charges.

Accordingly, in preferred embodiments, the aqueous polymer solution comprises further additives, wherein the further additives are selected from the group consisting of a polypeptide, an oligonucleotide, a nanoparticle, a macromolecule, and a small molecule catalyst.

Polypeptides such as enzymes generally have charged surfaces, making them suited for efficient blending in aqueous polymer solutions for use in the invention. Their relatively large size as molecules helps ensure that an entrapped polypeptide is efficiently retained in the porous film, and does no leech out. Examples of suitable polypeptides are lipases, peroxidases, lysozymes, pore-forming membrane proteins such as ion channels and aquaporins, pepsin, and peptidases.

Oligonucleotides are DNA or RNA strands and have a polycationic backbone. As a further additive, oligonucleotides embedded in a porous film can facilitate binding of dissolved oligonucleotides with a complementary sequence, or they can serve as an binding sites for compounds that specifically recognize or interact with oligonucleotides, such as intercalating substances, DNA-binding proteins, or antibodies. Preferred oligonucleotides have a length of at most 50, 45, 40, 35, 30, 25, 20, 19, 18, 17, 16, 15, 14, 13, 12, 11, 10, 9, 8, 7, 6, or 5 monomers.

Nanoparticle as such are known in the art. In the context of this invention, they are small particles ranging in size from about 5 nanometers to about 500 nm. Nanoparticles can have anti-microbial properties, can catalyze chemical reactions at their surface, or can have desirable optical properties. Examples of nanoparticles are silver nanoparticles, titanium nanoparticles, gold nanoparticles, copper nanoparticles, zinc nanoparticles, and quantum dots. Nanoparticles can be stabilized, for example via an oxide layer, a surfactant coating, or a hydrophobic coating.

Macromolecules are large molecules, such as polypeptides, oligonucleotides, macrocycles, biopolymers, certain lipids, and certain carbohydrates. Macromolecules as such are known in the art. The incorporation of a macromolecule in a porous film according to the invention can be of use for the production of a porous film that is recognized by compounds for which the macromolecule serves as an epitope or binding site. For example, certain microbial pathogens can bind carbohydrates involved in cell glycosylation. Other macromolecules can catalyze chemical conversions by providing appropriate binding sites for reaction transition states. Further examples of macromolecules are macrocycles such as crown ethers, cyclodextrins, calixarenes, phthalocyanines, and porphyrins, all of which are optionally charged. Crown ethers such as 4-sulfonato-calix[6]arene are of interest because they can facilitate interactions with ions or other charged moieties, which can result in porous films with ion-selective filtration properties, for example to purify metal and heavy metal contaminants from water. Phthalocyanines and porphyrins can similarly host metal ions and can catalyze various reactions such as oxidations, as known in the art.

Small molecule catalyst are known in the art and are often of interest in chiral conversions. For use as a further additive, small molecules per se can be expected to rapidly leech out of the films according to the invention. Accordingly, it is preferred that small molecule catalysts have a reactive moiety as described for cross linking agents. This allows their covalent incorporation in porous films according to the invention, preventing their leeching. The immobilization of catalysts on surfaces or supports is known in the art.

Preferably, the porous film that is created is a catalytic film, wherein the further additive is an enzyme, a small molecule catalyst, a macromolecule, or a nanoparticle.

Preferably, the porous film that is created is an ion binding or ion transporting film, wherein the further additive is a crown ether, preferably a charged crown ether such as 4-sulfonato-calix[6]arene. In this context the further additive can also be a polypeptide known to bind or transport ions, such as a pore forming ion channel membrane protein, haemoglobin, ferritin, lactoferrin, or transferrin.

In preferred embodiments, the porous film that is created is an anti-viral film or anti-microbial film. For such a film the aqueous polymer solution preferably comprises further additives selected from anti-microbial nanoparticles such as silver nanoparticles and stabilized silver nanoparticles, or anti-microbial polypeptides, or anti-microbial macromolecules. Anti-microbial polypeptides or macromolecules are known in the art, examples are polymers comprising quaternary ammonia, and gramicidin. In the context of this invention, an anti-microbial effect can be an anti-viral effect. In preferred embodiments, the porous film that is created is an antifouling film, wherein the trigger-responsive polymer is a low-fouling polymer such as PSBMA, poly(oligoethylene glycol)acrylate, or poly(oligoethylene glycol)methacrylate, such as polymers based on di-, tri-, or tetraethylene glycol acrylate or -methacrylate, for example poly(oligoethylene glycol)acrylate (pOEA), poly(oligoethylene glycol) acrylamide (pOEAAm), poly(oligoethylene glycol)methacrylate (pOEMA), poly(oligoethylene glycol)acrylamide (pOEMAAm). Further examples of low-fouling polymers are poly(ethylene glycol)s such as PEG2000, PEG3000, PEG5000, or PEG10.000; and polyoxazolines such as poly (2-methyl-oxazoline), poly(2-ethyl-oxazoline), or copolymers thereof; polysulfobetaines such as quaternary polypyrrolidinium compounds, quaternary esters or amides of (meth)acrylic acid, polyvinylpyridinium, polyvinylimidazolium compounds, or ionenes, for example poly(3-dimethyl [methacryloyloxyethyl] ammonium propane sulfonate) (pDMAPS), poly(3-dimethyl [methacrylamidopropyl] ammonium propane sulfonate) (pDMAAPS), poly(styrene-[N,N'-dimethyl(maleidmidopropyl)ammonium propane sulfonate]) poly(SDMMAAPS) or copolymers thereof; polycarbobetaines such as quaternary polypyrrolidinium compounds containing linear and branched alkylcarboxy groups, quaternary esters or amides of (meth)acrylic acid, in which the quaternary nitrogen is substituted by an alkoxy group of different chain length, polyzwitterions derived from polymeric heterocyclic or aromatic vinyl compounds, or copolymers thereof; and polyphosphobetaines such as poly(2-methacryloyloxyethyl phosphorylcholine) (pMPC). Such polymeric betaines are known in the art (Rankin & Lowe, DOI: 10.1021/ma701952c; U.S. Pat. Nos. 2,958,682; 3,819,589—all incorporated by reference). In the context of this invention an antifouling film does not accumulate adsorbed substances such as waste solutes that aspecifically bind the membrane. For example, in medical applications an antifouling film has low or absent interaction with serum albumins and other common solutes in bodily fluids such as blood.

In a second aspect, the invention relates to the porous films that are obtainable by a method of the first aspect. Preferably, these films are porous membranes or asymmetric porous membranes. They can be two-dimensional films or hollow fibers. The APS process and its associated kinetics of film formation lead to porous films with characteristics such as pore size, pore size distribution, pore location distribution, average pore shape, pore shape variation, and pore density which cannot be obtained with traditional NIPS.

Examples of particular films according to the invention have been described earlier herein, as the result of the method of their creation.

General Definitions

In this document and in its claims, the verb "to comprise" and its conjugations is used in its non-limiting sense to mean that items following the word are included, but items not specifically mentioned are not excluded. In addition, reference to an element by the indefinite article "a" or "an" does not exclude the possibility that more than one of the element is present, unless the context clearly requires that there be one and only one of the elements. The indefinite article "a" or "an" thus usually means "at least one".

The word "about" or "approximately" when used in association with a numerical value (e.g. about 10) preferably means that the value may be the given value more or less 1% of the value.

Molecules such as polymers described in this invention can be optionally substituted. Suitable optional substitutions are replacement of —H by a halogen. Preferred halogens are F, Cl, Br, and I. Further suitable optional substitutions are substitution of one or more —H by —NH$_2$, —OH, =O, alkyl, alkoxy, haloalkyl, haloalkoxy, alkene, haloalkene, alkyn, haloalkyn, and cycloalkyl. Alkyl groups have the general formula $C_nH_{2n+1}$ and may alternately be linear or branched. Unsubstituted alkyl groups may also contain a cyclic moiety, and thus have the concomitant general formula $C_nH_{2n-1}$. Optionally, the alkyl groups are substituted by one or more substituents further specified in this document. Examples of alkyl groups include methyl, ethyl, propyl, 2-propyl, t-butyl, 1-hexyl, 1-dodecyl, etc.

When a structural formula or chemical name is understood by the skilled person to have chiral centers, yet no chirality is indicated, for each chiral center individual reference is made to all three of either the racemic mixture, the pure R enantiomer, and the pure S enantiomer. When two moieties are said to together form a bond, this implies the absence of these moieties as atoms, and compliance of valence being fulfilled by a replacing electron bond. All this is known in the art.

Whenever a parameter of a substance is discussed in the context of this invention, it is assumed that unless otherwise specified, the parameter is determined, measured, or manifested under physiological conditions. Physiological conditions are known to a person skilled in the art, and comprise aqueous solvent systems, atmospheric pressure, pH-values between 6 and 8, a temperature ranging from room temperature to about 37° C. (from about 20° C. to about 40° C.), and a suitable concentration of buffer salts or other components. It is understood that charge is often associated with equilibrium. A moiety that is said to carry or bear a charge is a moiety that will be found in a state where it bears or carries such a charge more often than that it does not bear or carry such a charge. As such, an atom that is indicated in this disclosure to be charged could be non-charged under specific conditions, and a neutral moiety could be charged under specific conditions, as is understood by a person skilled in the art.

In the context of this invention, a decrease or increase of a parameter to be assessed means a change of at least 5% of the value corresponding to that parameter. More preferably, a decrease or increase of the value means a change of at least 10%, even more preferably at least 20%, at least 30%, at least 40%, at least 50%, at least 70%, at least 90%, or 100%. In this latter case, it can be the case that there is no longer a detectable value associated with the parameter.

The present invention has been described above with reference to a number of exemplary embodiments. Modifications and alternative implementations of some parts or elements are possible, and are included in the scope of protection as defined in the appended claims. All citations of literature and patent documents are hereby incorporated by reference.

EXAMPLES

Example 1

Polymer Film Comprising a Single Type of Polymer

Figure 1:
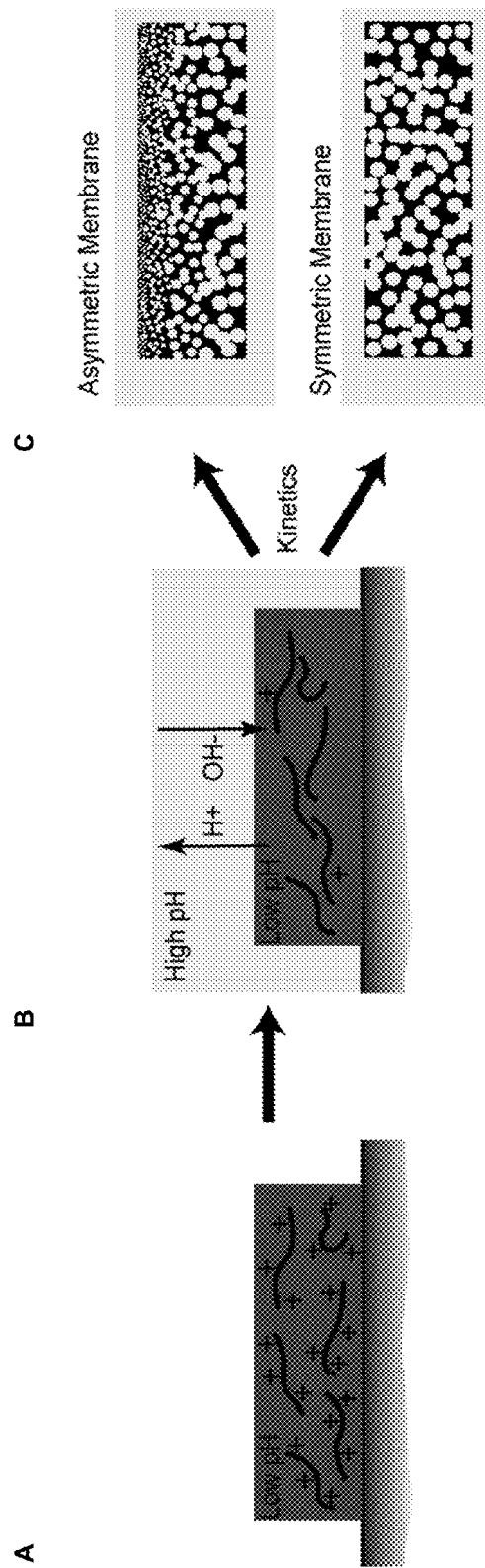
FIG. 1—schematic illustration of the aqueous phase separation (APS) process, in this case using a pH-based trigger to create a porous film. A) an aqueous polymer solution is applied on a surface to create a coated surface. The polymers in the coating are in solution in the low pH of the coating. B) the coated surface, which is coated with an aqueous polymer solution coating, is immersed in a coagulation bath. The bath comprises an aqueous coagulation solution in which the trigger-responsive polymer is not soluble. Equilibration of the overall pH to the value of the coagulation solution leads to phase change of the previously dissolved trigger-responsive polymer. C) based on the kinetics of the solvent exchange, the porous membrane can be symmetric (fast, near-simultaneous exchange throughout the entire coating) or asymmetric (fast exchange at one surface of the coating, slower exchange deeper within the coating).
Figure 2:
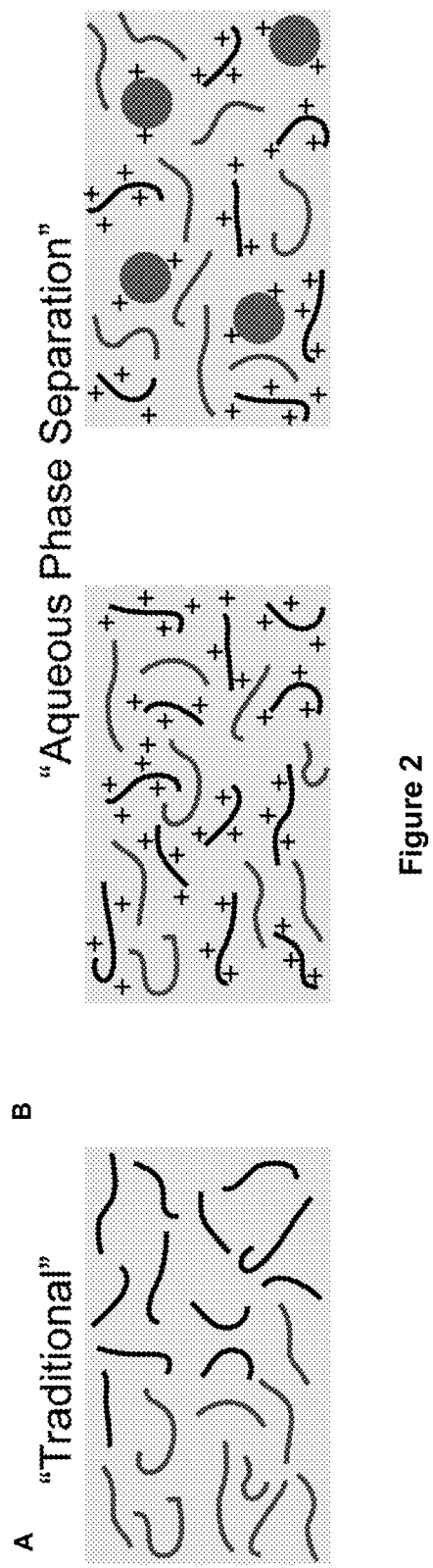
FIG. 2—schematic illustration of polymer blending and their outcomes. A) Blending two uncharged polymers often results in phase separation due to polymer incompatibility. B) For a charged and a neutral polymer, mixing is favoured as it maximizes the distance between the charged (self-repelling) polymers. C) This principle also holds when a third component with a higher or lower charge density is added, for example an enzyme. Full mixing remains the most favourable option to achieve distance between charges.
Figure 3:
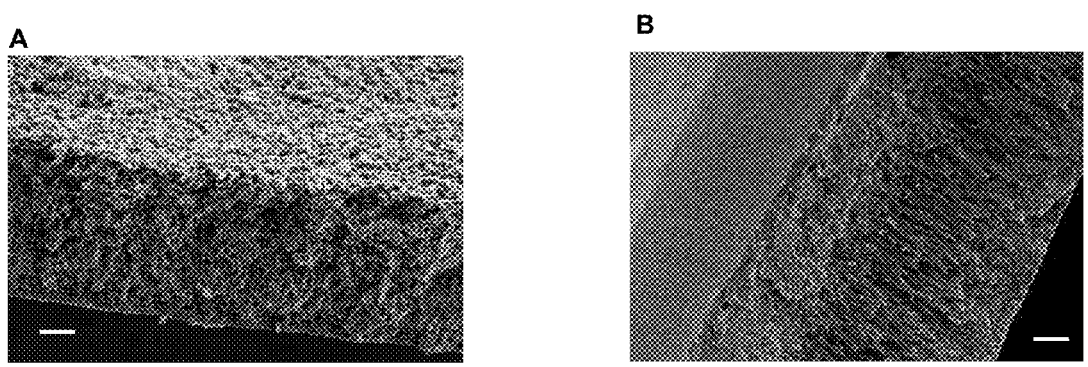
FIG. 3—scanning electron micrographs of P4VP porous films. Scale bars represent 10 µm. A) 17% by weight P4VP. B) 25% by weight P4VP.

An aqueous polymer solution comprising a trigger-responsive polymer (17% by weight P4VP, pH 1) was cast on a glass surface at 200 µm thickness and immersed in a coagulation bath (pH 12). Within 40 seconds the polymeric film turned white, indicating phase separation with a resultant porous structure. SEM investigations (FIG. 3a) show a clear interconnected porous structure, symmetrical throughout the film. Repeating this experiment at a higher polymer concentration (25%, FIG. 3b) led to a similarly porous film but with smaller pores. Also, some first hints of a more asymmetric structure are observed with small pores on top and a more open structure deeper down. The membrane material itself was strong but brittle, although when it is immersed in water it swelled slightly making it more flexible.

Example 2

Polymer Film Comprising Two Polyelectrolytes

Figure 4:
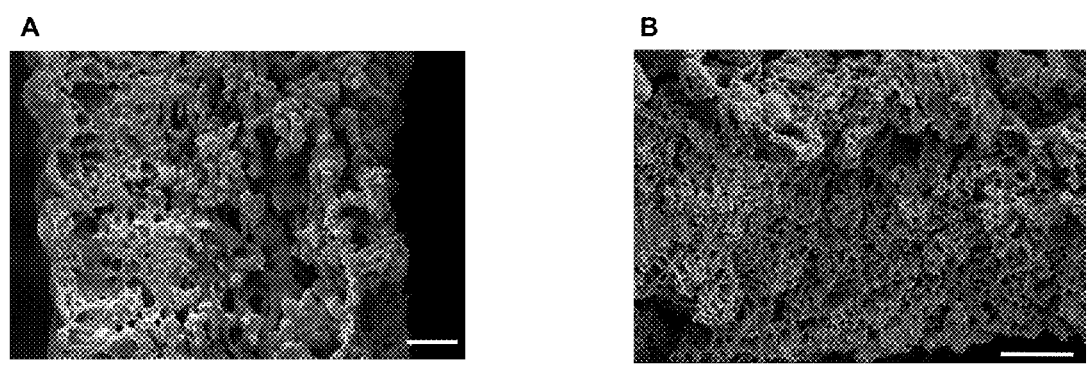
FIG. 4—scanning electron micrographs of polyelectrolyte porous films based on PSS and a weak polycation (either PAH or PEI). Scale bars represent 10 µm. A) PSS and PEI; the top of the membrane is on the left of the image. B) PSS and PAH; the top of the membrane is at the top of the image.

The polyelectrolyte Poly(styrene sulfonic acid) (PSS, strong polyanion) was mixed with either poly(ethylene imine) (PEI) or poly(alylamine) (PAH) (both weak polycations) in a one to one monomeric ratio (20% by weight polyelectrolyte) at pH 13. At this pH, PEI and PAH are uncharged and mix easily and without complexation with the anionic PSS. A film was cast and immediately immersed in a coagulation bath at pH 2. As shown in FIG. 4, phase separation led to porous materials in both cases, albeit with different structures. The PEI/PSS film has quite open pores and cavities, but the top layer seems relatively dense. For PAH/PSS the pores are smaller and the layer is more uniform. Another porous films (not shown) was successfully prepared with the use of the polyelectrolytes poly(acrylic acid) (PAA) and poly(diallyl-dimethyl-ammonium chloride) (PDADMAC). The mechanical strength of the membrane materials varied depending on the used polyelectrolytes, from soft and flexible to hard an brittle. The materials swell somewhat in water and were found to be stable in organic solvents including THF, hexane, and acetone.

Example 3

Crosslinking of Polymer Films

Figure 5:
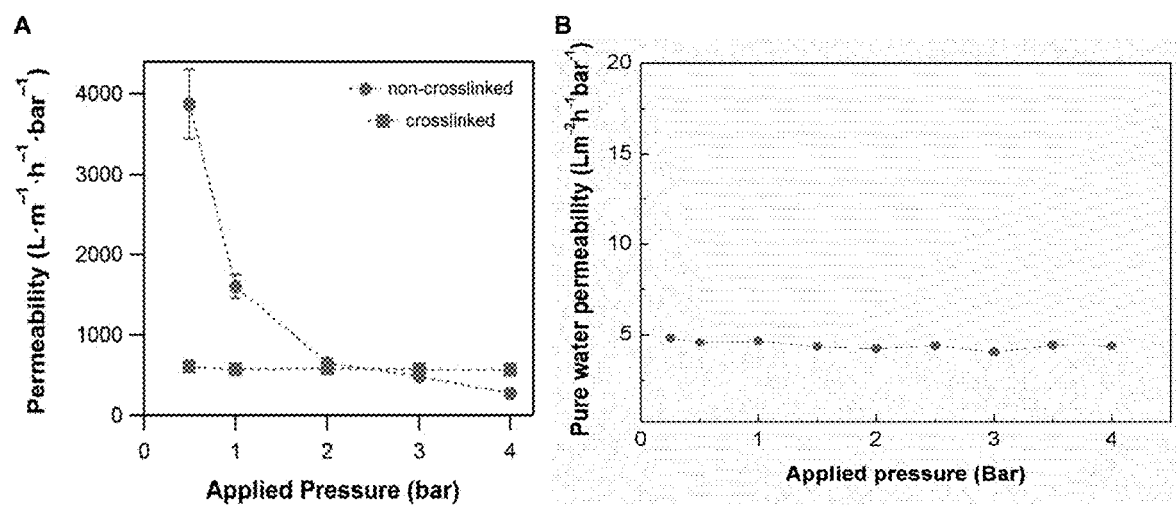
FIG. 5—pure water permeabilities of the porous films as prepared by the method according to the invention, as a function of pressure applied to the water as a driving force for transport. A) permeability for a P4VP porous film with and without crosslinking. B) permeability for a PAH/PSS based membrane crosslinked with glutaraldehyde; a non-crosslinked film was also prepared but it tore during the measurement due to a lack of mechanical stability.

The pure water permeability of porous films prepared by the method according to the invention was compared for crosslinked and non-crosslinked films. As shown in FIG. 5, for a non-crosslinked porous film of P4VP a decrease in permeability as a function of applied pressure was observed. The non-crosslinked film was prepared as described in example 1. This result indicates that the porous film becomes compacted under pressure, lowering its permeability at higher pressures. For a crosslinked film crosslinked with 1,6-dibromohexane (2% (vol.) for 2 hours), however, the mechanical properties are improved and a completely stable permeability is observed, indicating a stable structure. Similar results were observed for PAH/PSS crosslinked with glutaraldehyde (0.05% (wt.) for 4 hours). For the PAH/PSS porous film the retention of a fluorescent dye (calcein, a small water soluble organic molecule of 623 g/mol) was measured and was observed to be 98%, demonstrating that these porous films can be used as membranes to retain, for example, small organic molecules. The non-crosslinked film, prepared as described in example 2, tore under the pressure applied during the comparative experiment.

REFERENCES CITED

U.S. Pat. No. 2,958,682
U.S. Pat. No. 3,819,589
WO2017043233
De Grooth, J.; Oborny, R.; et al., J. Membrane Science, 2014, 475, 311.
Loeb, S.; ACS Symposium Series, Vol. 153, DOI: 10.1021/bk-1981-0153.ch001
Rankin and Lowe; Macromolecules 2008, 41, 614-622; DOI: 10.1021/ma701952c
Reuvers, A. J.; van den Berg, J. W. A.; Smolders, C. A. J. Membrane Science, 1987, 34, 45.
Wandera, D.; Wickramasinghe, S. R.; Husson, S. M. Journal of Membrane Science, 2010, 357, 6.

The invention claimed is:

1. A method for creating a porous film through aqueous phase separation, the method comprising the steps of:
   I) providing an aqueous polymer solution comprising a dissolved trigger-responsive polymer wherein the trigger-responsive polymer is responsive to a change in pH, and wherein at least 80% of the solvent is water;
   II) contacting the aqueous polymer solution with an aqueous coagulation solution in which the trigger-responsive polymer is not soluble, and wherein at least 80% of the solvent of the aqueous coagulation solution is water, and wherein the aqueous coagulation solution has a suitable pH difference from the aqueous polymer solution to cause a transition from soluble to insoluble for the trigger-responsive polymer, allowing an entirely aqueous phase separation process; and
   III) allowing solvent exchange between the aqueous polymer solution and the coagulation solution to form a porous film.

2. The method according to claim 1, wherein the trigger-responsive polymer is selected from the group consisting of poly(2-diethylaminoethylmethacrylate) (PDEA), poly(N-isopropyl-acrylamide) (PNIPAM), poly(methacrylic acid)-co-(methyl methacrylate) (PMAA-co-PMMA), poly(4-vinylpyridinium) (P4VP), poly(methacrylic acid) (PMAA), poly(acrylic acid) (PAA), poly(styrene sulfonic acid) (PSS), polyaminostyrene (PAS), poly(styrene)-co-(maleic acid) (PS-co-PMA), poly(maleic acid) (PMA), poly(vinyl sulfonic acid) (PVS), sulfonated polyethersulfone (sPES), sulfonated polysulfone (sPSU), poly(ethylene imine) (PEI), poly(allylamine) (PAH), elastin-like polypeptide (ELP), poly(2-(dimethylamino)ethyl methacrylate) (PDMAEMA), poly(diallyl-dimethyl-ammonium chloride) (PDADMAC), poly(oligoethylene glycol)acrylate (pOEA), poly(oligoethylene glycol)acrylamide (pOEAAm), poly(oligoethylene glycol)methacrylate (pOEMA), poly(oligoethylene glycol) acrylamide (pOEMAAm), sulphonated poly(ether ether ketone) (SPEEK), chitosan, and polysulfobetaine (PSBMA), or a copolymer thereof.

3. The method according to claim 2, wherein the trigger-responsive polymer is a polycationic polyelectrolyte or a polyanionic polyelectrolyte,
   wherein the polycationic polyelectrolyte is selected from the group consisting of poly(2-diethylaminoethylmethacrylate) (PDEA), poly(4-vinylpyridinium) (P4VP), polyaminostyrene (PAS), poly(ethylene imine) (PEI), poly(allylamine) (PAH), poly(2-(dimethylamino)ethyl methacrylate) (PDMAEMA), chitosan, and poly(diallyl-dimethyl-ammonium chloride) (PDADMAC), or a copolymer thereof, and
   wherein the polyanionic polyelectrolyte is selected from the group consisting of poly(methacrylic acid)-co-(methyl methacrylate) (PMAA-co-PMMA), poly(methacrylic acid) (PMAA), poly(acrylic acid) (PAA), poly(styrene sulfonic acid) (PSS), poly(vinyl sulfonic acid) (PVS), sulfonated polyethersulfone (sPES), sulfonated polysulfone (sPSU), poly(styrene)-co-(maleic acid) (PS-co-PMA), sulphonated poly(ether ether ketone) (SPEEK), and poly(maleic acid) (PMA), or a copolymer thereof.

4. The method according to claim 3, wherein the aqueous polymer solution comprises both a polycationic polyelectrolyte and a polyanionic polyelectrolyte.

5. The method according to claim 4, wherein the aqueous polymer solution comprises equal amounts of the polycationic polyelectrolyte and of the polyanionic polyelectrolyte, determined by monomeric ratio.

6. The method according to claim 4, wherein the aqueous polymer solution comprises an excess of the polycationic polyelectrolyte or of the polyanionic polyelectrolyte, determined by monomeric ratio.

7. The method according to claim 1, further comprising the step of:
   IV) crosslinking the porous film.

8. The method according to claim 7, wherein the crosslinking is via dihaloalkanes, diamines, via heating of the porous film, or via radiation.

9. The method according to claim 7, wherein the aqueous polymer solution comprises equal amounts of a polycationic polyelectrolyte and of a polyanionic polyelectrolyte, determined by monomeric ratio, and
   wherein the crosslinking reduces the amount of anionic groups in the polyanionic polyelectrolye, or reduces the amount of cationic groups in the polycationic polyelectrolyte.

10. The method according to claim 1, wherein the aqueous polymer solution comprises further additives, wherein the further additives are selected from the group consisting of a polypeptide, a nanoparticle, and a macromolecule.

11. The method according to claim 10, wherein the porous film is a catalytic film, wherein the further additive is an enzyme, a small molecule catalyst, a macromolecule, or a nanoparticle.

12. The method according to claim 1, wherein the porous film is an anti-viral film or anti-microbial film, wherein the aqueous polymer solution comprises further additives selected from the group consisting of anti-microbial nanoparticles, anti-microbial polypeptides, and anti-microbial macromolecules.

13. The method according to claim 1, wherein the porous film is an asymmetric porous film, wherein the method comprises the additional steps of:
    selecting a suitable concentration for the trigger-responsive polymer, or
        selecting a suitable temperature for step II), or
        selecting a suitable temperature for step III), or
        selecting a suitable coagulation solution.

\* \* \* \* \*